Sept. 15, 1953     C. C. MINTER     2,651,942
LINEAR RESPONSE VAPOR PRESSURE THERMOMETER
Filed Sept. 2, 1949
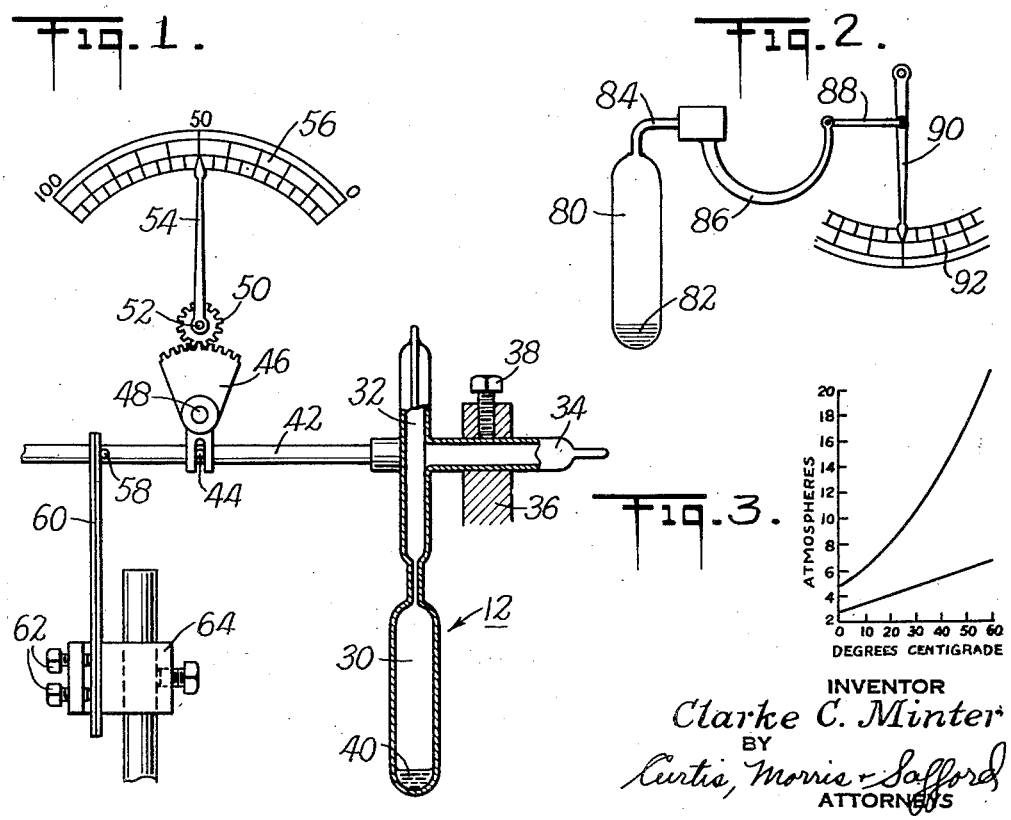
INVENTOR
Clarke C. Minter
BY
Curtis, Morris & Safford
ATTORNEYS Patented Sept. 15, 1953

2,651,942

UNITED STATES PATENT OFFICE 2,651,942

LINEAR RESPONSE VAPOR PRESSURE THERMOMETER

Clarke C. Minter, Washington, D. C., assignor to Foxboro Company, Foxboro, Mass., a corporation of Massachusetts Application September 2, 1949, Serial No. 113,848

7 Claims. (Cl. 73—369)

This invention relates to temperature measurement and more particularly to an improved thermometric system of the vapor pressure type. The thermometric system of the present invention is adapted to be incorporated in apparatus for measuring and indicating, recording and/or controlling temperature. The present application is a continuation-in-part of my prior application, Serial No. 557,130, filed October 4, 1944, now Patent No. 2,548,550.

One of the known methods of measuring temperature involves introducing into a closed system a quantity of a vaporizable liquid which is placed in heat-conductive relation through a heat-conductive wall of the system with the medium whose temperature is to be measured. The liquid is so chosen that it exerts an appreciable vapor pressure at temperatures within the range to be measured and the closed system includes pressure-responsive means responsive to the vapor pressure of the liquid and connected to a pointer, pen or the like to indicate or record the value of the temperature.

The vapor pressure thermometers previously proposed are open to the serious objection that the vapor pressure of a liquid is a non-linear function of temperature and therefore the temperature scale must be graduated to fit each liquid and range used. On the low end of a range, the temperature graduations are close together, while on the upper end of the same range the graduations are spread much more widely apart. This condition renders the reading of the lower end of the scale less accurate than that of the upper end of the scale and often to a lesser degree of accuracy than required. This condition also presents a serious problem in the manufacture of dials as each one has to be laid out specially for the vapor pressure relation of the liquid used to fill the vapor pressure measuring system and for the range to be indicated. The layout of the printing plate used for printing recording charts for such a scale is even more difficult because of the methods involved.

It is an object of the present invention to provide a thermometric system of the vapor pressure type wherein the vapor pressure is a substantially linear function of the measured temperature, thereby overcoming the above-outlined defects of prior thermometers of this type. It is another object of the invention to provide a vapor pressure thermometer having a linear characteristic and wherein both the temperature range and the vapor pressure range may be preselected. It is a further object of the invention to provide a method of introducing the vapor pressure medium into the thermometric system to meet the preselected conditions. Other objects of the invention will be in part obvious and in part pointed out hereafter.

The many objects and advantages of the present invention may be best understood and appreciated by referring to the accompanying drawings and the explanation thereof which is given below.

In the drawings:

Figure 1 is a diagrammatic illustration of a thermometric system embodying the present invention;

Figure 2 shows an alternative and relatively simple thermometric system embodying the invention; and, Figure 3 is a graph of the vapor pressures of pure propane and of certain propane dodecane mixtures, which graph will be used in describing and explaining the specific example of my invention set forth below.

I have found that the invention of my parent application, Serial No. 557,130 can be used with advantage in the measurement of temperature alone as distinguished from relative humidity. Referring to Figure 1 of the drawings, the body of liquid mixture 40 in chamber 30 is responsive to the temperature of the ambient atmosphere around the chamber 30 and exerts a pressure that is linearly related thereto. This pressure is transmitted to the upper chamber 32 to cause a proportional force to be exerted on the rod 42 which force is opposed by the action of strip 60. In the structure of Figure 1, the element 60 may be either a resilient bimetallic strip or simply a leaf spring. The reference scale 56 may be calibrated directly in terms of temperature and the rod 42 causes indicator 54 to be moved to indicate the temperature value.

In Figure 2, a thermometric system is shown which is functionally the same as that of Figure 1 but is somewhat simpler in construction. Referring to Figure 2, an enclosed generally cylindrical chamber 80, exposed to the temperature to be measured, contains the body of liquid mixture 82 capable of exerting a vapor pressure that is substantially a linear function of the temperature to be measured. The chamber 80 is connected by a tube 84 with a conventional Bourdon tube 86. The movable end of tube 86 is connected by a link 88 with an indicating pointer 90 that cooperates with a reference scale 92 calibrated directly in terms of temperature. As the temperature of the medium surrounding chamber 80 varies, the vapor pressure exerted by the liquid body 82 varies in a manner proportional to the temperature variations. The vapor pressure variations are transmitted to the Bourdon tube and, by movement of the movable end of the tube, to the pointer 90 which indicates the value of the temperature. Because of the linear relation between vapor pressure and temperature the reference scale may be uniformly calibrated and the disadvantages of the conventional vapor pressure thermometer, as pointed out above, can be avoided.

As disclosed in my parent application, Serial No. 557,130, the desired substantially linear relationship between temperature and vapor pressure may be secured by introducing into the temperature-responsive chambers 30 and 80 of Figures 1 and 2 a quantity of a mixture of a relatively volatile and a relatively non-volatile liquid which bears a predetermined relation to the total vapor volume of the thermometric system. The liquid of low volatility is preferably so selected that it is substantially non-volatile within the range of temperatures being measured and in the following discussion and computation the non-volatile component will be assumed to have a negligible vapor pressure. The relatively volatile liquid preferably has a substantial vapor pressure within the temperature range being measured.

It is known that the vapor pressure of most liquids varies as an exponential function of absolute temperature and it is also known that when a relatively volatile liquid is dissolved in a non-volatile liquid, the vapor pressure of the volatile liquid is depressed. In many cases, particularly where the two liquids have similar chemical properties and do not tend to interact chemically, the relation between the vapor pressure of the mixture and the vapor pressure of the pure volatile constituent may be expressed by Raoult's law as follows:

(1) $$P_s = \frac{n}{n+1} P_t$$

In this equation:

$P_s$ = the vapor pressure of the mixture at any temperature.

$n$ = the number of moles of liquid volatile component per mole of non-volatile component.

$\frac{n}{n+1}$ = the mole fraction of volatile component in the liquid.

$P_t$ = the vapor pressure of the pure volatile constituent at the same temperature.

If the quantity of liquid mixture is large in relation to the volume of vapor space the mole fraction of the volatile component remains substantially constant as the temperature varies and the vapor pressure of the mixture, though less than the vapor pressure of the pure component, still increases exponentially with increasing temperature. If, on the other hand, the vapor space is large with respect to the quantity of liquid, an increase in temperature causes an appreciable amount of the volatile component to be distilled from the liquid mixture, thereby changing substantially the composition of the liquid. This reduction in the mole fraction of the volatile component with increasing temperature causes the pressure to rise less rapidly than it otherwise would. As pointed out in my parent application, I have found that it is possible to take advantage of this phenomenon and so select the proportions of the liquid mixture and the relation between the volume of liquid and volume of vapor as to cause the liquid mixture to exert a vapor pressure that is a substantially linear function of temperature. This result may be achieved by using any pair of miscible liquids that obey substantially Raoult's law. Preferably the two liquids are selected from the same homologous series of compounds. Examples of suitable pairs of liquids are octyl chloride and methyl chloride, ethane and decane, and propane and dodecane.

In order to point out more fully the nature of the present invention, the following discussion is given of the factors involved in the design and filling of a thermometric system so that the relative and absolute amounts of the components of the liquid mixture to be introduced into the system can be determined so that the resultant system will have the desired linear temperature scale.

The volume of a system is established by practical physical limitations and in a system such as shown in Figure 2, in practice, might be between 5 cc. and 10 cc. The volume may change slightly as the pressure of the system changes in response to temperature changes, however, such change is too small to consider in any computations. Hence, it may be assumed that the volume of the system is constant throughout its temperature range.

The vapor space above the liquid may change slightly due to the distilling off of the volatile component as the temperature rises. However, the volume of the vapor space is large relative to the volume of the liquid mixture and it may be assumed that the volume of the vapor space remains constant throughout this temperature range of the system.

The choice of the liquid components requires that each liquid have a different vapor pressure from that of other liquid components at any given temperature. More than two liquids may be used to control the resultant vapor pressure relation to temperature. However, to simplify the example, I have chosen propane as the volatile component and dodecane for the less volatile or non-volatile component. To further simplify, I have chosen as an example a thermometric system having a range of from 0° C. to 80° C. Within this range, it may be assumed that the vapor pressure of the dodecane is negligible.

In addition to the above assumption it may be further assumed that the mass of propane in the system remains constant.

The vapor pressure of propane and of dodecane are known. If a pressure, is selected as a desired pressure for the thermometric system at a selected temperature such as 0° C., the relative amounts of propane and dodecane may be determined for the liquid mixture by applying Raoult's law. The pressure of the system selected must be below that of the propane and above that of the dodecane for the selected temperature. In addition to the amount of propane in the liquid mixture, there is propane in vapor phase. Knowing the pressure of the system, the proportions of the liquid mixture at 0° C., and the vapor pressure of the propane at two other selected temperatures, it is possible to calculate the amount of propane in vapor phase at the selected temperature and the resultant pressure in the system which will have a linear pressure relation at the three selected temperatures.

The following is the table of values thus calculated from the values of the example:

| Temperature, °C. | Vapor pressure of pure propane in atmospheres | Pressure of system in atmospheres |
|---|---|---|
| 0 | 4.64 | 2.59 |
| 40 | 13.15 | 5.79 |
| 80 | 29.80 | 9.00 |

Moles propane per mole of dodecane in liquid phase at 0° C_____ 1.26.
Moles propane per mole of dodecane in vapor phase at 0° C_____ .496.
Slope of curve $P_g/T$ (linear)_____ (.0309 atmospheres/°C.).
Total moles propane per mole dodecane in system_____ 1.756.
Volume of thermometric system_____ 10 cc.
Volume of dodecane in system_____ .52 cc. (liquid).
Volume of propane in system_____ 35.3 cc. (vapor).

It has been found that when the quantities of the two liquid components to be introduced into the thermometric system are computed in accordance with the procedure outlined above, the resulting vapor pressure of the mixture is quite close to a linear function of temperature. However, certain of the assumptions on which the foregoing computation is predicated are not exact and therefore it is desirable after the thermometric system has been filled with the calculated quantities of liquid to make minor adjustments in these quantities in order to secured a vapor pressure-temperature relationship that is more nearly linear. It has been found that such minor adjustments can be readily made to give the desired linear relationship.

At the temperature at which a thermometric system of this type is normally filled, the volatile component is in the vapor phase and the less volatile component is in the liquid phase. To determine the quantities of either component to the required degree of accuracy by weight or volumetric measurement is impractical due to the relatively small quantities involved. However, a novel method of filling the thermometric system of this invention has been discovered which overcomes these difficulties and which provides a relatively simple means of measuring the relative and absolute quantities of each component. In the novel method of filling this thermometric system, the less volatile component, in liquid phase, is measured volumetrically and introduced into the temperature sensitive chamber. The chamber and the supply of the more volatile component are then brought to a selected temperature for which the pressure of the resultant thermometric system is also known. The air is evacuated from the chamber and then the more volatile component, in vapor phase, is introduced into the chamber until the less volatile liquid has absorbed the proper amount of vapor and the vapor space has been filled to the pressure required of the resultant system for the selected filling temperature. Thus by this process of filling the thermometric system, the proper relative amounts of the components are introduced into the system regardless of any errors in the weight or volume of the first component of the filling.

From the foregoing description, it is apparent that the present invention provides a novel and substantially improved thermometric system of the vapor pressure type. Since the relationship between vapor pressure and temperature is substantially linear, a linear reference scale may be used and the various deficiencies of the prior vapor pressure systems, as outlined above, may be overcome. It is, of course, to be understood that the foregoing example is illustrative only and that various modifications may be made within the scope of the invention. For example, the liquid mixture used may comprise more than two components and pairs of volatile and non-volatile components other than those specifically mentioned can be used. It is also apparent that the present invention provides a novel and practical method of introducing the components into a vapor pressure system as described.

Since many embodiments might be made of the present invention and since many changes might be made in the embodiment disclosed herein, it is to be understood that the foregoing description is to be interpreted as illustrative only and not in a limiting sense.

What is claimed is:

1. In a thermometric system, in combination, a closed temperature-responsive chamber containing a mixture of mutually miscible compounds, one of which is relatively more volatile than the other and which exhibits a vapor pressure which varies non-linearly with temperature within the range of temperatures being measured, said chamber containing both liquid and vapor and the vapor space in said chamber being large in relation to the space occupied by said liquid, the relative and absolute quantities of said compounds in said chamber being such that the vapor pressure within said chamber is a substantially linear function of the temperature to which said chamber is responsive and means responsive to the pressure in said chamber for measuring the value of the temperature to which said chamber is made responsive.

2. In a thermometric system, in combination, a closed temperature-responsive chamber containing a mixture of mutually soluble liquids which substantially obey Raoult's law, one of which is relatively more volatile than the other and which exhibits a vapor pressure which varies non-linearly with temperature within the range of temperatures being measured, said chamber having a vapor space that is large in relation to the space occupied by said liquid mixture, the relative and absolute quantities of said liquids in said chamber being such that the vapor pressure within said chamber is a substantially linear function of the temperature to which the chamber is responsive and means responsive to the pressure in said chamber for measuring the value of the temperature to which said chamber is made responsive.

3. In a thermometric system, in combination, a closed temperature-responsive chamber containing a liquid mixture of mutually soluble volatile and relatively non-volatile hydrocarbons, the relatively non-volatile hydrocarbon being one that exhibits a negligible vapor pressure within the temperature range being measured and the volatile liquid being one that exhibits a substantial vapor pressure within the temperature range being measured, said chamber having a vapor space that is large in relation to the space occupied by said liquid mixture, the relative and absolute quantities of said hydrocarbons in said chamber being such that the vapor pressure within said chamber is a substantially linear function of the temperature to which said chamber is responsive and means responsive to the pressure in said chamber for measuring the value of the temperature to which said chamber is made responsive.

4. In a thermometric system, in combination, a closed temperature-responsive chamber containing a liquid mixture of propane and dodecane, said chamber having a vapor space that is large in relation to the space occupied by said liquid mixture, the relative and absolute quantities of propane and dodecane in said chamber being such that the vapor pressure within said chamber is a substantially linear function of the temperature to which said chamber is responsive, and means responsive to the pressure in said chamber for measuring the valve of said temperature.

5. In a thermometric system, in combination, a closed temperature-responsive chamber containing a mixture of a plurality of mutually miscible liquids which substantially obey Raoult's law, each of said liquids differing in volatility and one or more of which exhibits a vapor pressure which varies non-linearly with temperature within the range of the temperature being measured, said chamber having a vapor space that is large in relation to the space occupied by said liquid mixture, the relative and absolute quantities of said liquid in said chamber being such that the vapor pressure within said chamber is a substantially linear function of the temperature to which the chamber is responsive and means responsive to the pressure in said chamber for measuring the value of the temperature to which said chamber is made responsive.

6. In a thermometric system, in combination, a closed temperature-responsive chamber containing a mixture of mutually soluble volatile and relatively non-volatile liquids which substantially obey Raoult's law, the relatively non-volatile liquid being one that exhibits a negligible vapor pressure within the temperature range being measured and the volatile liquid being one that exhibits a substantial vapor pressure within the range of temperature being measured, said chamber having a vapor space that is large in relation to the space occupied by said liquid mixture, the relative and absolute quantities of said liquids in said chamber being such that the vapor pressure within said chamber is a substantially linear function of the temperature to which said chamber is responsive and means movable in proportional response to the pressure in said chamber for measuring the value of the temperature to which said chamber is made responsive.

7. In a thermometric system, in combination, a closed temperature-responsive chamber containing a mixture of mutually soluble volatile and relatively non-volatile liquids which substantially obey Raoult's law, the relatively non-volatile liquid being one that exhibits a negligible vapor pressure within the temperature range being measured and the volatile liquid being one that exhibits a substantial vapor pressure within the range of temperature being measured, said chamber having a vapor space that is large in relation to the space occupied by said liquid mixture, the relative and absolute quantities of said liquids in said chamber being such that the vapor pressure within said chamber is a substantially linear function of the temperature to which said chamber is responsive, means movable in proportional response to the pressure in said chamber for measuring the value of the pressure in said chamber, and indicating means actuated by said proportionally movable means for indicating the value of the temperature to which said chamber is made responsive.

CLARKE C. MINTER.

References Cited in the file of this patent

UNITED STATES PATENTS

| Number | Name | Date |
|---|---|---|
| 1,629,174 | Patton | May 17, 1927 |
| 1,797,258 | Crosthwait, Jr., et al. | Mar. 24, 1931 |
| 1,915,265 | Bichowsky | June 20, 1933 |
| 1,965,126 | Kojola | July 3, 1934 |
| 2,072,915 | Willach | Mar. 9, 1937 |
| 2,124,072 | Luckey et al. | July 19, 1938 |
| 2,144,762 | Kendall | Jan. 24, 1939 |
| 2,475,317 | Gess | July 5, 1949 |

FOREIGN PATENTS

| Number | Country | Date |
|---|---|---|
| 74,452 | Switzerland | Feb. 16, 1917 |
| 542,147 | France | Aug. 5, 1922 |
| 150,953 | Austria | Oct. 11, 1937 |